C. B. SCHOENMEHL.
PRIMARY BATTERY ELECTRODE.
APPLICATION FILED APR. 23, 1912.
1,198,066. Patented Sept. 12, 1916.
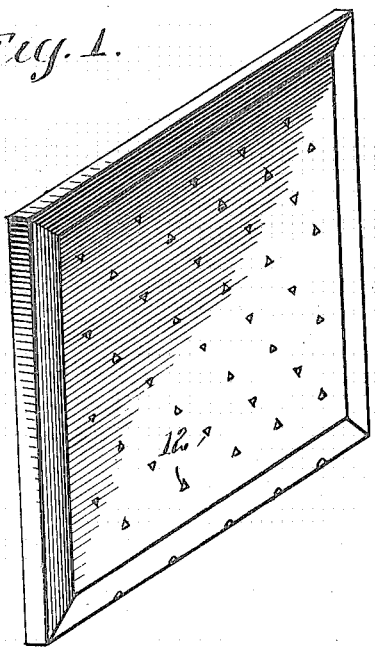
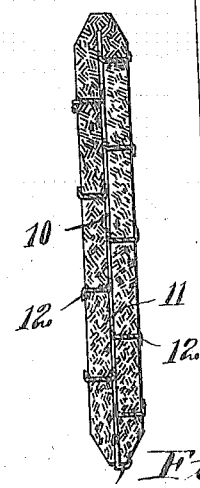
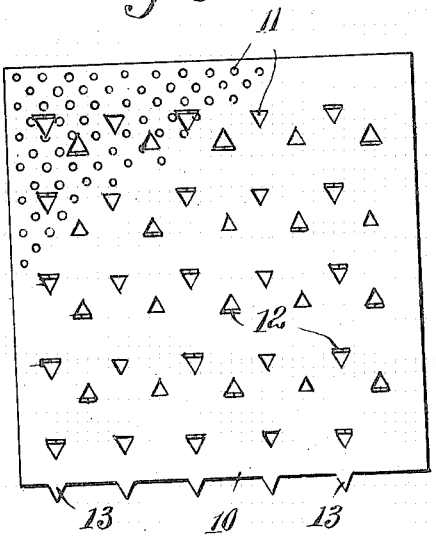
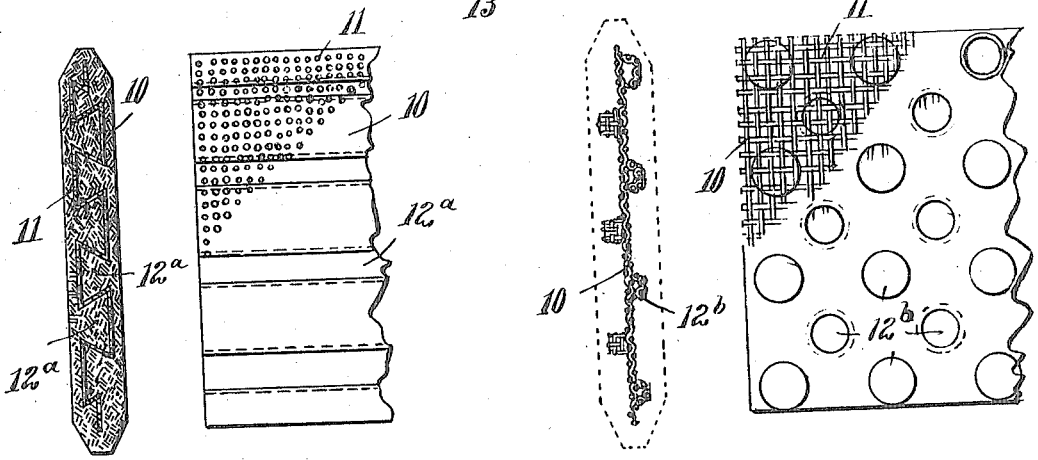
Witnesses
Ivan L. Morehouse
Mildred Macleod
Inventor
Charles B. Schoenmehl
By Chamberlain & Newman
Attorneys

UNITED STATES PATENT OFFICE.

CHARLES B. SCHOENMEHL, OF WATERBURY, CONNECTICUT.

PRIMARY-BATTERY ELECTRODE.

1,198,066.

Specification of Letters Patent.   Patented Sept. 12, 1916.

Application filed April 23, 1912.   Serial No. 692,736.

*To all whom it may concern:*

Be it known that I, CHARLES B. SCHOEN-MEHL, citizen of the United States, and resident of Waterbury, in the county of New Haven and State of Connecticut, have invented certain new and useful Improvements in Primary-Battery Electrodes, of which the following is a specification.

This invention relates to primary batteries and particularly to negative electrodes therefor.

It further and particularly relates to what are known as plate forms of negative electrodes, such as are made by compressing and baking finely powdered oxid of copper scale. Electrodes of this class have heretofore been made in various forms and shapes, particularly adapting them to be supported within a battery jar, and various means have also been employed for protecting said electrodes against breakage in manufacture and shipment, and also for improving the conductive qualities of the element, but so far as I am aware, these protective means have been in the form of externally applied contrivances.

It is therefore the purpose of my invention to accomplish the above results by an internal reinforcement of metal that is first made of a suitable size and proportion and then formed internally of, and integral with the compressed copper oxid in the way to insure the permanent attachment of the oxid to the reinforcement and to prevent breakage and disassemblement of the parts of the plate in case the same should become fractured and finally to improve the conductivity of the element, thereby insuring a high initial, and a uniform working E. M. F. of the battery.

Upon the accompanying drawings forming a part of this specification, like characters of reference will be found to designate similar parts throughout the several figures, and of which, Figure 1, shows a perspective view of a compressed copper oxid negative electrode constructed in accordance with the spirit of my invention. Fig. 2, is a central vertical cross sectional view of the electrode shown in Fig. 1. Fig. 3, is a side view of a perforated and suitable blanked sheet metal reinforcing member upon which the oxid plate is formed in the manner shown in Figs. 1 and 2. Fig. 4, shows a further sectional view corresponding with Fig. 2, but including a slightly modified form of perforated sheet metal reinforcement. Fig. 5, is a side view, partially broken away, of the reinforcement contained within the plate shown in Fig. 4. Fig. 6, shows a further side view, partially broken away, of a further modified form of reinforcement made from wire netting, and, Fig. 7, is a vertical sectional view of the reinforcement shown in Fig. 6.

These electrodes may be made substantially square as shown in the drawings, rectangular or round as desired and can be most conveniently and inexpensively made by employing a flexible perforated or wire mesh sheet of metal that is blanked, corrugated, cupped or otherwise formed to best insure the securement of the oxid thereto as will be obvious.

Upon the drawings, 10 represents the metal reinforcement and 11 the perforations or openings therethrough, which latter may be of any suitable shape and size to insure the integral formation of parts of the electrode, throughout the thickness of its body portion.

In Figs. 1, 2 and 3, I have shown a metal reinforcement formed of perforated sheet metal having triangular forms of metal points 12 cut and stamped up therefrom, the same being deflected outward at a right angle from the plate. A substantial and equal number of such points are projected from the opposite sides. The total diameter of the plate from point to point of the tips is slightly greater than that of the completed electrode so that when the electrode is formed in a press, the ends of the points will be bent over and down upon the opposite sides of the electrode in a way to better clench the oxid thereto. In this connection it will be understood that in the formation of the electrode the reinforcing blank will be first placed centrally in the mold, the loose oxid next filled in around it, and then the die of the press closed together to squeeze the blank and oxid into one solid integral mass. If preferred, these points may be also formed along one or more edges of the reinforcing blank, as shown by 13 along the bottom edge of the sheet shown in Figs. 1, 2 and 3 whereby the edge portion of the electrode may also be protected against the chipping or breakage.

In Figs. 4 and 5, I have shown a perforated sheet metal blank that is bent crosswise to form transverse dovetail pockets 12ª in the opposite sides of the sheet and into which the oxid is filled, pressed and rigidly supported, and by means of which an electrode may be formed in accordance with my invention, and the metal reinforcement not appear upon the face of the finished electrode.

Figs. 6 and 7 are designed to illustrate the substitution of a piece of wire netting for perforated sheet metal in the carrying out of my invention and in this instance I have shown a series of pockets or cups 12ᵇ punched in the opposite side of the wire reinforcement to form pockets to receive and better support the attached oxid. In practice this metal reinforcement is formed very thin so that it may more readily yield, go and come to conform to any unevenness of pressure due to possible excessive quantities of oxid on different portions of the face of the reinforcement so as to insure a finished negative electrode of uniform density and thickness throughout.

Having thus described my invention what I claim and desire to secure by Letters Patent is:—

1. A compressed oxid of copper negative electrode having a perforated reinforcing sheet therein, and having extended points to overlap the face and edge portions of the electrode.

2. A negative electrode for primary batteries, comprising a mass of oxid of copper and a centrally arranged sheet metal reinforcing member embedded therein and having a series of openings therethrough to admit of the solid formation of the oxid therethrough and having extended points to extend through and overlap the edge portions of the electrode.

Signed at Bridgeport in the county of Fairfield and State of Connecticut this 22nd day of April A. D., 1912.

CHARLES B. SCHOENMEHL.

Witnesses:
C. M. NEWMAN,
RUTH M. WORDEN.